United States Patent [19]

Toyota et al.

[11] 4,143,223

[45] Mar. 6, 1979

[54] PROCESS FOR POLYMERIZING ALPHA-OLEFINS AND CATALYST THEREFOR

[75] Inventors: Akinori Toyota, Iwakuni; Syuji Minami, Ohtake; Norio Kashiwa, Iwakuni, all of Japan

[73] Assignee: Mitsui Petrochemical Industries Ltd., Tokyo, Japan

[21] Appl. No.: 773,266

[22] Filed: Mar. 1, 1977

[30] Foreign Application Priority Data

Mar. 1, 1976 [JP] Japan ................................. 51-21179

[51] Int. Cl.$^2$ ........................... C08F 4/02; C08F 10/06
[52] U.S. Cl. ................................. 526/125; 252/429 B; 252/429 C; 252/431 R; 526/124; 526/142; 526/151; 526/351; 526/906
[58] Field of Search ........... 252/429 B, 429 C, 431 R; 526/124, 125, 151

[56] References Cited

U.S. PATENT DOCUMENTS

| | | | |
|---|---|---|---|
| 3,642,746 | 2/1972 | Kashiwa et al. | 526/125 |
| 4,069,169 | 1/1978 | Toyoda et al. | 526/125 |
| 4,076,924 | 2/1978 | Toyota et al. | 526/125 |
| 4,085,276 | 4/1978 | Toyota et al. | 526/125 |

FOREIGN PATENT DOCUMENTS 2230672 12/1972 Fed. Rep. of Germany.
2504036 8/1975 Fed. Rep. of Germany.

*Primary Examiner*—Edward J. Smith
*Attorney, Agent, or Firm*—Sherman & Shalloway

[57] ABSTRACT

A process for polymerizing or copolymerizing α-olefins in the presence of a catalyst composed of (A) a mechanically pulverized solid titanium-containing catalyst component and (B) an organometallic compound of a metal of Groups I to III of the periodic table, wherein said titanium-containing component is a solid halogen-containing titanium catalyst component obtained by reacting a mechanically copulverized solid product in the absence of mechanical pulverization with a titanium compound which is liquid under the reaction conditions, said mechanically copulverized product being derived from (1) a magnesium compound, (2) an organic acid ester, and (3) an active hydrogen-containing compound selected from the group of alcohols and phenols; and a catalyst composition used therefor.

4 Claims, No Drawings

PROCESS FOR POLYMERIZING ALPHA-OLEFINS AND CATALYST THEREFOR

This invention relates to a process for polymerizing α-olefins and a catalyst suitable for use in the process. More specifically, the invention relates to a process for producing highly stereoregular α-olefin polymers or copolymers in improved yields with a superior polymer output per unit weight of a solid titanium compound used as a catalyst component, and per unit weight of halogen containing the solid titanium compound while greatly inhibiting the formation of a fine powdery polymer which is detrimental to the separation of the resulting desired polymer. The catalyst used has a superior activity in terms of the number of grams of the polymer formed per millimole of titanium atom per hour. Furthermore, the time required for mechanical copulverization in catalyst preparation can be shortened.

The present invention provides a process for polymerizing or copolymerizing α-olefins in the presence of a catalyst composed of (A) a mechanically pulverized solid titanium-containing catalyst component and (B) an organometallic compound of a metal of Groups I to III of the periodic table, wherein said titanium-containing catalyst component is a solid halogen-containing titanium component obtained by reacting a mechanically copulverized solid product in the absence of mechanical pulverization with a titanium compound which is liquid under the reaction conditions, said mechanically copulverized solid product being derived from (1) a magnesium compound (2) an organic acid ester, and (3) an active hydrogen-containing compound selected from the group of alcohols and phenols; and a catalyst composition suitable for use in the practice of this process.

Methods have heretofore been suggested for polymerizing or copolymerizing α-olefins in the presence of a catalyst composed of (A) a solid titanium compound mechanically pulverized in the presence or absence of another compound, and (B) an organometallic compound of a metal of Groups I to III of the periodic table. One example of the titanium catalyst component of this type is the highly active titanium catalyst component disclosed in Japanese Laid-Open Patent Publication No. 126590/75 (laid open on Oct. 4, 1975) which is obtained by contacting a halogen-containing magnesium compound with an aromatic carboxylic acid ester by a mechanically pulverizing means, and reacting the resulting mixture with a titanium compound. This Patent Publication does not at all give a description about pulverization in the presence of the active hydrogen-containing compound (3). Highly stereoregular α-olefin polymers or copolymers can be prepared with superior activity using the solid titanium compound suggested in this Publication. On further investigations, it was found that a further improvement is desired in the output of polymer or copolymer per unit weight of halogen which is likely to be contained in the resulting polymer or copolymer, and cause rust to fabricating molds and other metallic materials at the time of, say, molding, and that the formation of a fine powdery polymer detrimental to the separation of the resulting polymer cannot be ignored, and it is desired to inhibit the formation of such a fine powdery polymer. Moreover, it is desired to further shorten the time required for mechanical copulverization in catalyst preparation.

Another suggestion was made in Japanese Laid-Open Patent Publication No. 16986/73 laid open on Mar. 3, 1973 (corresponding to West German OLS No. 2,230,672, and to French Pat. No. 2,143,347). Example 13 of this patent discloses a solid titanium compound used as a catalyst component which was prepared by dissolving anhydrous magnesium chloride in anhydrous ethanol, evaporating the ethanol rapidly, drying the residue at 300° C. and 0.1 mmHg, and mechanically copulverizing the resulting product together with a complex of $TiCl_4$ and ethyl benzoate. This patent fails to disclose anything about a solid titanium catalyst component which is obtained by reacting the aforesaid titanium compound with a liquid titanium compound in the absence of mechanical pulverization. The amount of polymer yielded in Example 13 is as low as 1340 g/Ti millimole. The stereospecificity (I.I. - - - - the boiling n-heptane extraction residue) is as low as 74.3%.

The present inventors furthered their investigations in order to overcome the disadvantages of the prior art methods mentioned above. These investigations led to the discovery that the use of a solid halogen-containing titanium compound obtained by reacting a mechanically copulverized solid product derived from (1) a magnesium compound, (2) an organic acid ester, and (3) an active hydrogen-containing compound selected from the group of alcohols and phenols, with titanium compound liquid under the reaction conditions in the absence of mechanical pulverization can increase the output of polymer per gram of the halogen which becomes a cause of rust formation in the first-mentioned prior patent, and inhibit the undersirable formation of a fine powdery polymer in the aforementioned patent. It was also found that the low yield and the low stereoregularity of polymer in the second prior patent mentioned above can be obviated.

It was confirmed as shown in Comparative Examples 1 and 2 to be given hereinbelow that when the mechanically copulverized solid product derived from the compounds (1), (2) and (3) is used without reaction with the specified titanium compound in the absence of mechanical pulverization, or the reaction of the solid product with the titanium compound is carried out in the presence of mechanical pulverization, the improvement contemplated by the present invention cannot be achieved.

It is an object of this invention therefore to provide a process for polymerizing olefins, which can overcome the disadvantages of the conventional processes for polymerizing or copolymerizing α-olefins in the presence of a catalyst composed of (A) a mechanically pulverized solid titanium catalyst component, and (B) an organometallic compound of a metal of Groups I to III of the periodic table.

Another object of this invention is to provide a catalyst composition for polymerization or copolymerization of α-olefins which is used in performing the aforesaid improved process of this invention.

The above and other objects of the invention along with its advantages will become more apparent from the following description.

The solid halogen-containing titanium catalyst component used in the process of this invention is obtained by reacting a mechanically pulverized solid product derived from (1) a magnesium compound, (2) an organic acid ester, and (3) an active hydrogen-containing compound selected from alcohols and phenols, with a titanium compound liquid under the reaction conditions in the absence of mechanical pulverization.

The magnesium compound (1) used in this invention is preferably a compound containing a halogen or both a halogen and an organic group (including a member selected from hydrocarbon groups, alkoxy groups, aryloxy groups and acyloxy groups) which may further contain another metal such as aluminum, tin, silicon or germanium. The magnesium compound may be prepared by any method, and may also be a mixture of two or more such compounds. Examples of the magnesium compound are decomposition products of organic Mg compounds such as Grignard reagents. There can also be used complex compounds obtained by dissolving halogen-containing magnesium compounds with or without other compounds soluble in acetone and ether, such as $Al(OR)_nX_{3-n}$ (in which R is a hydrocarbon group, X is a halogen atom, and $0 \leq n \leq 3$) or $GeCl_4$, in the aforesaid solvent, and then evaporating the solvent. Of the exemplified compounds, magnesium dihalides and their complex compounds are preferred. Examples of especially preferred magnesium compounds (1) used in this invention are compounds of the formula $MgX^1X^2$ wherein $X^1$ is halogen and $X^2$ represents a member selected from halogen atoms, and the groups $OR''$ in which $R''$ is a group selected from the group consisting of alkyl groups, preferably alkyl groups containing 1 to 10 carbon atoms, cycloalkyl groups, preferably cycloalkyl groups containing 6 to 12 carbon atoms, and aryl groups, preferably, a phenyl group optionally substituted by an alkyl group containing 1 to 4 carbon atoms. Specific examples include $MgCl_2$, $MgBr_2$, $MgI_2$, $MgF_2$, $Mg(OCH_3)Cl$, $Mg(OC_2H_5)Cl$, $Mg(O\ n\text{-}C_4H_9)Cl$,

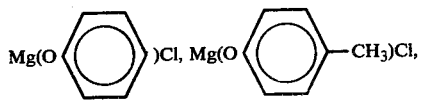

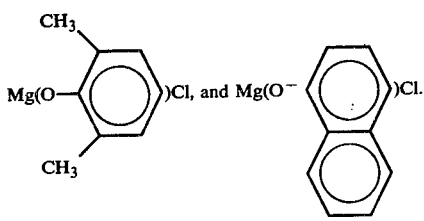

Preferably, the magnesium compound (1) is as anhydrous as possible. It is permissible however for the magnesium compound to contain moisture in an amount which does not substantially affect the performance of the catalyst. For the convenience of use, it is advantageous to use the magnesium compound as a powder having an average particle diameter of about 1 to about 50 microns. Since a mechanical pulverization step is essential in the preparation of the titanium catalyst component, larger particle sizes are also feasible.

Examples of the organic acid ester (2) used in this invention are (i) aliphatic carboxylic acid esters containing 2 to 40 carbon atoms, (ii) alicyclic carboxylic acid esters containing 7 to 20 carbon atoms, (iii) aromatic carboxylic acid esters containing 8 to 40 carbon atoms, and (iv) lactones containing 4 to 10 carbon atoms. More specifically, the organic acid esters include the following.

i. Esters formed between a member selected from saturated or unsaturated aliphatic carboxylic acids containing 1 to 18, preferably 1 to 4 carbon atoms, and halogen-substitution products of the above carboxylic acids, and a member selected from the group consisting of saturated or unsaturated aliphatic primary alcohols containing 1 to 18, preferably 1 to 4, carbon atoms, saturated or unsaturated cycloaliphatic alcohols containing 3 to 8, preferably 5 to 6, carbon atoms, phenols containing 6 to 10, preferably 6 to 8, carbon atoms, saturated or unsaturated primary alcohols containing 1 to 4 carbon atoms and bonded to an aliphatic ring with 3 to 10 carbon atoms, and saturated or unsaturated primary alcohols containing 1 to 4 carbon atoms and bonded to an aromatic ring with 6 to 10 carbon atoms;

ii. Esters formed between alicyclic carboxylic acids containing 6 to 12, preferably 6 to 8, carbon atoms and saturated or unsaturated primary alcohols containing 1 to 8, preferably 1 to 4, carbon atoms;

iii. Esters formed between aromatic carboxylic acids containing 7 to 18 carbon atoms, preferably 7 to 12 carbon atoms, and a member selected from the group consisting of saturated or unsaturated aliphatic primary alcohols containing 1 to 18, preferably 1 to 4, carbon atoms, saturated or unsaturated cycloaliphatic alcohols containing 3 to 8, preferably 5 to 8, carbon atoms, phenols containing 6 to 10, preferably 6 to 8, carbon atoms, saturated or unsaturated primary alcohols containing 1 to 4 carbon atoms and bonded to an aliphatic ring with 3 to 10 carbon atoms, and saturated or unsaturated primary alcohols containing 1 to 4 carbon atoms and bonded to an aromatic ring with 6 to 10 carbon atoms; and iv. 5- or 6- membered cyclic lactones containing 4 to 10 carbon atoms.

Specific examples of the esters (i) are primary alkyl esters of saturated fatty acids such as methyl formate, ethyl acetate, n-amyl acetate, 2-ethylhexyl acetate, n-butyl formate, ethyl butyrate, and ethyl valerate; alkenyl esters of saturated fatty acids such as vinyl acetate or allyl acetate; primary alkyl esters of unsaturated fatty acids such as methyl acrylate, methyl methacrylate or n-butyl crotonate; and halogenated aliphatic monocarboxylic acid esters such as methyl chloroacetate or ethyl dichloroacetate.

Specific examples of the esters (ii) are methyl cyclohexanecarboxylate, ethyl cyclohexanecarboxylate, methyl methylcyclohexanecarboxylate, and ethyl methylcyclohexanecarboxylate.

Specific examples of the esters (iii) are alkyl benzoates in which the alkyl group is a saturated or unsaturated hydrocarbon group usually containing 1 to 8 carbon atoms, preferably 1 to 4 carbon atoms, such as methyl benzoate, ethyl benzoate, n- or i-propyl benzoate, n-, i-, sec- or tert-butyl benzoate, n- or i-amyl benzoate, n-hexyl benzoate, n-octyl benzoate, 2-ethylhexyl benzoate, vinyl benzoate, and allyl benzoate (preferably methyl benzoate and ethyl benzoate); cycloalkyl benzoates in which the cycloalkyl group is a non-aromatic cyclic hydrocarbon group usually containing 3 to 8 carbon atoms, preferably 5 to 6 carbon atoms, such as cyclopentyl benzoate and cyclohexyl benzoate; aryl benzoates in which the aryl group is a hydrocarbon group usually containing 6 to 10 carbon atoms, preferably 6 to 8 carbon atoms in which halogen and/or an alkyl group with 1 to 4 carbon atoms may be bonded to the ring, such as phenyl benzoate, 4-tolyl benzoate, benzyl benzoate, styryl benzoate, 2-chlorophenyl benzoate, and 4-chlorobenzyl benzoate; aromatic monocarboxylic acid esters in which an electron-donating substituent, such as a member selected from halogens, alkoxy groups and alkyl groups, may be bonded to the aromatic ring; alkoxy benzoates in which the alkyl group constituting the alkoxy group is an alkyl group usually containing 1 to 4 carbon atoms, preferably methyl or ethyl, and the alkyl and aryl groups in the ester are the same as described hereinabove, such as methyl anisate, ethyl anisate, i-propyl anisate, i-butyl anisate, phenyl anisate, benzyl anisate, ethyl o-methoxybenzoate, methyl p-ethoxybenzoate, ethyl p-ethoxybenzoate, n-butyl p-ethoxybenzoate, ethyl-p-allyloxybenzoate, phenyl p-ethoxybenzoate, methyl o-ethoxybenzoate, ethyl veratrate, and ethyl asym-guaiacolcarboxylate; alkylbenzoic acid esters in which the alkyl group attached to the aromatic ring of benzoic acid is a saturated or unsaturated hydrocarbon group usually containing 1 to 8 carbon atoms, and the alkyl and aryl groups of the ester are the same as mentioned hereinabove, such as methyl p-toluate, ethyl p-toluate, i-propyl p-toluate, n- or i-amyl toluate, allyl p-toluate, phenyl p-toluate, 2-tolyl p-toluate, ethyl o-toluate, ethyl m-toluate, methyl p-ethylbenzoate, ethyl p-ethylbenzoate, sec-butyl p-ethylbenzoate, i-propyl o-ethylbenzoate, n-butyl m-ethylbenzoate, ethyl 3,5-xylenecarboxylate, and ethyl p-styrenecarboxylate; halogen-substituted benzoic acid esters (in which the halogen is chlorine, bromine, or iodine, preferably chlorine), such as methyl chlorobenzoate, ethyl chlorobenzoate, n-butyl chlorobenzoate, and benzyl chlorobenzoate.

Examples of the lactones (iv) are γ-butyrolactone, δ-valerolactone, coumarin, and phthalide.

Of these, the benzoic acid, alkylbenzoic acid, and alkoxybenzoic acid esters are preferred. Alkyl esters with 1 to 4 carbon atoms, especially methyl or ethyl esters, of benzoic acid, o- or p-toluic acid, and p-anisic acid are especially preferred.

These esters are usually employed as such, but may be fed to the reaction system in such a form which will form an ester during the formation of the mechanically pulverized solid product derived from the compounds (1), (2) and (3). For example, when an alkoxy-magnesium compound is used as the magnesium compound, the organic acid ester may be supplied in the form of a carboxylic acid halide.

The active hydrogen-containing compound (3) used in this invention includes, for example, aliphatic acohols containing 1 to 12 carbon atoms, preferably 3 to 12 carbon atoms, more preferably 6 to 12 carbon atoms; alicyclic alcohols containing 3 to 12 carbon atoms, preferably 6 to 12 carbon atoms, aromatic alcohols containing 7 to 12 carbon atoms, and phenols containing 6 to 18 carbon atoms.

Specific examples of these compounds include alcohols such as methanol, ethanol, n- or iso-propanol, n-, iso-, sec- or tert-butanol, n-pentanol, 2-methyl butanol, hexanol, 2-ethylhexanol, ethyleneglycohol monomethylether, mono-n-butylether or monophenylether, cyclopentyl alcohol, cyclohexanol, 2,6-dimethylhexanol, menthol, benzyl alcohol, phenethyl alcohol, and cumyl alcohol; and phenols such as phenol, cresol, xylenol, butyl phenol, octyl phenol, nonyl phenol, dibutyl phenol, naphthol, and cumyl phenol. Of the alcohols, alcohols containing at least 3 carbon atoms, such as n-butanol and aromatic alcohols are preferred, and monohydric alkylphenols are the preferred phenols.

The organic acid ester (2) and the active hydrogen-containing compound (3) may be used in the form of a complex with the magnesium compound (1).

Suitable titanium compounds used to prepare the solid titanium compound (A) in this invention are tetravalent titanium compounds of the following formula

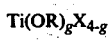

wherein R is a hydrocarbon group selected from the group consisting of alkyl groups, preferably containing 1 to 4 carbon atoms, cycloalkyl groups, preferably containing 6 to 12 carbon atoms, and aryl groups, preferably containing 6 to 10 carbon atoms; X is halogen; and $0 \leq g \leq 4$. Examples of such titanium compounds are titanium tetrahalides such as $TiCl_4$, $TiBr_4$ and $TiI_4$; alkoxytitanium trihalides such as $Ti(OCH_3)Cl_3$, $Ti(OC_2H_5)Cl_3$, $Ti(O\ n\text{-}C_4H_9)Cl_3$, $Ti(OC_2H_5)Br_3$, $Ti(O\ iso\text{-}C_4H_9)Br_3$ and $Ti(O\ cyclo\text{-}C_6H_{12})Cl_3$; aryloxy titanium trihalides such as $Ti(OC_6H_5)Cl_3$,

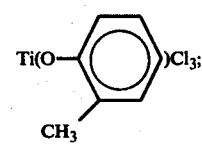

alkoxytitanium dihalides such as $Ti(OCH_3)_2Cl_2$, $Ti(OC_2H_5)_2Cl_2$, $Ti(O\ n\text{-}C_4H_9)_2Cl_2$, and $Ti(OC_2H_5)_2Br_2$; trialkoxytitanium monohalides such as $Ti(OCH_3)_3Cl$, $Ti(OC_2H_5)_3Cl$, $Ti(O\ n\text{-}C_4H_9)_3Cl$, and $Ti(OC_2H_5)_3Br$; and tetraalkoxy titaniums such as $Ti(OCH_3)_4$, $Ti(OC_2H_5)_4$, and $Ti(O\ n\text{-}C_4H_9)_4$. Of these, the titanium tetrahalides are preferred, and titanium tetrachloride is most preferred.

The magnesium compound (1) and the titanium compound are used preferably as halides. When they are used in other forms, it is necessary to include halogen in the final solid titanium catalyst component by using a suitable halogenating agent.

The solid halogen-containing titanium catalyst component (A) used in this invention is prepared by reacting the mechanically pulverized solid product derived from the compounds (1), (2) and (3), with the titanium compound liquid under the reaction conditions in the absence of mechanical pulverization. In the copulverization process, the compounds (1), (2) and (3) may be pulverized together. Or it is possible to copulverize any two compounds, then add the remaining compound, and further pulverize them together. The order of addition, and the method of addition (for example, whether to add a particular compound at a time or portionwise) can be properly chosen.

The copulverization may be carried out in the copresence of an inorganic or organic filler such as LiCl, $CaCO_3$, $CaCL_2$, $SrCl_2$, $BaCl_2$, $Na_2SO_4$, $Na_2CO_3$, $TiO_2$, $NaB_4O_7$, $Ca_3(PO_4)_2$, $CaSO_4$, $BaCO_3$, $Al_2(SO_4)_3$, $B_2O_3$, $Al_2O_3$, $SiO_2$, polyethylene, polypropylene or polystyrene.

The mechanical copulverization is carried out using a ball mill, a vibratory mill, or impact mill or the like preferably in the substantial absence of oxygen or water.

The "mechanical copulverization", as used in this application, denotes pulverization which imparts a violent pulverizing effect to a material, and excludes such means as mere mechanical stirring.

The ratio between the magnesium compound (1) and the organic acid ester (2) in copulverization is such that the latter is used in an about of about 0.01 to about 10 moles, preferably about 0.01 to about 5 moles, especially preferably about 0.01 to about 1 mole, per atom of magnesium in the former. The amount of the active hydrogen-containing compound (3), when it contains at least 3 carbon atoms; is about 0.001 to about 10 moles, preferably about 0.01 to about 1 mole, especially preferably about 0.01 to about 0.5 mole, per atom of magnesium in the magnesium compound (1). When it contains 2 or less carbon atoms, the amount is preferably about 0.001 to about 10 moles, more preferably about 0.01 to about 5 moles, especially preferably about 0.01 to about 3 moles.

The pulverization conditions should preferably be chosen according to the types of the materials or the pulverizing apparatus used. Generally, the pulverization time is about 1 hour to 10 days. The pulverization can be carried out at room temperature, and it is not especially necessary to cool or heat the pulverization system. Usually, however, temperatures of about 0° to 100° C. can be employed.

Where the organic acid ester or the active hydrogen-containing compound is solid, especially strong pulverization is desired. For example, when pulverization is to be performed in a vibratory ball mill, the strength of pulverization is desirably such that 20 to 40 g of materials to be treated are placed in an inner cylinder (100 mm in inside diameter) of an 800 ml. stainless steel (SUS 32) vibratory ball mill which accommodates therein 2.8 kg of stainless steel (SUS 32) balls each with a diameter of 15 mm, and pulverized at an impact acceleration of 7G for at least 3 hours, preferably at least 6 hours, especially preferably at least 24 hours.

The mechanically copulverized solid product so produced from the compounds (1), (2) and (3) is then reacted in the absence of mechanical pulverization with a titanium compound which is liquid under the reaction conditions.

The term "in the absence of mechanical pulverization", as used in the present application, means that the violent mechanical copulverizing action used at the time of forming the solid product from the compounds (1), (2) and (3) is absent, but such an operation as mere stirring is permissible.

It is preferred that the above reaction be performed while suspending the mechanically copulverized solid product in a normally liquid titanium compound such as titanium tetrachloride, or a solution of it in an inert solvent such as hexane, heptane or kerosene, or a solution of a normally solid titanium compound in the inert solvent. This procedure undergoes little effects of traces of impurities generated in the copulverizing step, and makes it possible to vary the proportions of the raw materials within a broad range.

The amount of the titanium compound varies according to the amounts of the organic acid ester (2) and the active hydrogen-containing compound (3), but is desirably such that about 0.001 to about 1000, preferably at least about 0.05, titanium atoms are used per atom of magnesium.

There is no special restriction on the temperature at which the solid copulverization product is reacted with the titanium compound in the liquid phase. Usually, it is convenient to perform the reaction at about 20° to about 200° C. for at least 0.5 hour. Preferably, the solid halogen-containing titanium compound is isolated after the reaction, and washed well with an inert solvent before it is used for polymerization.

A typical example of the composition of the solid halogen-containing titanium catalyst component which is suitable for polymerization catalysts, although varying according to the conditions for catalyst preparation, is: 2.0–5.0% by weight of titanium, 16.0–25.0% by weight of magnesium, 55.0–65.0% by weight of halogen, and 5.0–15.0% by weight of the organic acid ester. The composition does not substantially change by washing with hexane at room temperature.

Usually, the resulting solid halogen-containing titanium compound has a surface area of at least 10 m$^2$/g, preferably at least 50 m$^2$/g, especially preferably at least 100 m$^2$/g.

The organometallic compound (B) of a metal of Groups I to III of the periodic table to be used in conjunction with the titanium catalyst component (A) is a compound having a hydrocarbon group directly bonded to a metal. Examples of the organometallic compound (B) are alkylaluminum compounds, alkylaluminum alkoxides, alkylaluminum hydrides, alkylaluminum halides, dialkyl zincs, and dialkyl magnesiums. Of these, the organoaluminum compounds are especially suitable. Examples of the organoaluminum compounds are trialkyl or trialkenyl aluminums such as $Al(C_2H_5)_3$, $Al(CH_3)_3$, $Al(C_3H_7)_3$, $Al(C_4H_9)_3$, or $Al(C_{12}H_{25})_3$; alkylaluminum compounds in which a number of aluminum atoms are connected through an oxygen or nitrogen atom, such as $(C_2H_5)_2AlOAl(C_2H_5)_2$, $(C_4H_9)_2AlOAl(C_4H_9)$, or

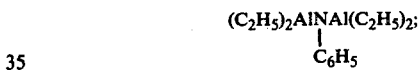

dialkylaluminum hydrides such as $(C_2H_5)_2AlH$ or $(C_4H_9)_2AlH$; dialkylaluminum halides such as $(C_2H_5)_2AlCl$, $(C_2H_5)_2AlI$, or $(C_4H_9)_2AlCl$; and dialkylaluminum alkoxides or phenoxides such as $(C_2H_5)_2Al(OC_2H_5)$ or $(C_2H_5)_2AL(OC_6H_5)$. The trialkylaluminums are most preferred.

Examples of the olefins used for polymerization are ethylene, propylene, 1-butene, and 4-methyl-1-pentene. The olefins can be homopolymerized, random-copolymerized and block-copolymerized. In copolymerization, a polyunsaturated compound such as a conjugated or nonconjugated diene can be used as a comonomer. Examples of the dienes are 5-ethylidene-2-norbornene, 1,7-octadiene, vinyl cyclohexene, 1,4-hexadiene, and dicyclopentadiene.

Highly stereoregular polymers can be obtained in high yields especially when the process of this invention is applied to the polymerization of α-olefins having at least 3 carbon atoms, the copolymerization of these olefins with the dienes, and the copolymerization of the α-olefins having at least 3 carbon atoms with a minor amount of ethylene.

The polymerization can be carried out either in the liquid or gaseous phase. When it is carried out in the liquid phase, an inert organic solvent such as hexane, heptane or kerosene can be used as a reaction medium, or the olefin itself can be used as the reaction medium. In the liquid-phase polymerization, it is preferred that the concentration of the solid halogen-containing titanium catalyst component (A) be adjusted to about 0.001 to about 0.5 millimoles calculated as titanium atom, and the concentration of the organometallic compound (B)

to about 0.1 to about 50 millimoles, both per liter of liquid phase.

A molecular weight regulator such as hydrogen may be used during the polymerization. It is also possible to perform the polymerization in the copresence of an ether, ethylene glycol derivative such as ethylene glycol monomethylether, a ketone, an amine, a sulfur-containing compound, a nitrile, or an ester in order to control the stereoregularity of the polymer. An organic acid ester, especially an aromatic carboxylic acid ester, is preferred as such a controlling agent. The species of the aromatic carboxylic acid esters which are exemplified hereinabove with regard to the preparation of the solid halogen-containing titanium compound can be chosen for this purpose. Especially suitable species are benzoic acid esters and ring-substituted benzoic acid esters, such as toluates, anisates, phthalate diesters, terephthalate diesters, hydroxybenzoates, and aminobenzoates. The lower alkyl toluates, such as methyl p-toluate or ethyl p-toluate are most preferred.

Such a controlling agent may be used in the form of an adduct with the organometallic compound (B). The effective amount of the controller is usually about 0.001 to about 10 moles, preferably about 0.01 to about 2 moles, especially preferably about 0.1 to about 1 mole, per mole of the organometallic compound (B).

The polymerization temperature for olefins is about 20° to about 200° C., preferably about 50° to about 180° C. The polymerization pressure is from atmospheric pressure to about 50 kg/cm$^2$, preferably about 2 to about 20 kg/cm$^2$.

The polymerization can be carried out by any of batchwise, semi-continuous and continuous methods. It is also possible to perform the polymerization in two or more stages under different reaction conditions.

The following examples illustrate the present invention more specifically.

EXAMPLE 1 AND COMPARATIVE EXAMPLES 1 AND 2

Preparation of the catalyst component (A)

Commercially available magnesium chloride (20 g), 6.30 g of ethyl benzoate and 14.49 g of ethanol were placed in an 800 ml. stainless steel (SUS-32) ball mill cylinder having an inside diameter of 100 mm and accomodating therein 2.8 kg of stainless steel (SUS-32) balls with a diameter of 15 mm under an atomosphere of nitrogen and contacted with one another at an impact acceleration of 7G. Ten grams of the resulting solid product was suspended in 100 ml. of titanium tetrachloride, and the suspension was stirred at 110° C. for 2 hours. It was again suspended in 100 ml of TiCl$_4$, and reacted at 110° C. for 2 hours. The solid component was collected by filtration, and washed with refined hexane until free titanium tetrachloride was no longer detected in the wash liquid. The washed product was dried to afford a titanium-containing solid catalyst component containing 3.0% by weight of titanium and 58.5% by weight of chlorine.

Polymerization

A 2-liter autoclave was purged with propylene, and charged with 750 ml of hexane thoroughly deprived of oxygen and water, 0.744 g (3.75 millimoles) of triisobutyl aluminum, 0.188 g (1.25 millimoles) of methyl p-toluate, and 0.0359 g (0.0225 millimole calculated as titanium atom) of the solid catalyst component (A) prepared by the procedure of the preceding section. The autoclave was sealed, and 0.3 Nl of hydrogen was introduced. The temperature was raised. When the temperature of the polymerization system reached 60° C., propylene was introduced, and its polymerization was started at a total pressure of 8 kg/cm$^2$. After polymerizing at 60° C. for 4 hours, the introduction of propylene was stopped. The inside of the autoclave was cooled to room temperature, and the resulting solid was collected by filtration, and dried to afford 209.5 g of polypropylene as a white powder, which had a boiling n-heptane extraction residue of 96.1%, an apparent density of 0.36 g/ml, and a melt index (MI) of 1.70. On the other hand, concentration of the liquid phase afforded 5.8 g of a solvent-soluble polymer. A very fine polymer having a particle size of less than 105 microns was formed in an amount of 8% by weight.

For comparison, the following two runs were performed.

In the preparation of the catalyst component (A) on Example 1, anhydrous magnesium chloride was dissolved in ethanol, and then the ethanol was evaporated rapidly. The residue was dried under reduced pressure. The resulting product and a complex of ethyl benzoate and titanium tetrachloride were copulverized in the same way as in Example 1 to afford a solid product. Without treating the product with titanium tetrachloride, it was directly used in the polymerization of propylene under the same conditions as in Example 1. (Comparative Example 1)

Propylene was polymerized under the same conditions as in Example 1 except using a catalyst component (A) which was prepared by placing 20 g of the copulverized solid product and 1.9 g of titanium tetrachloride in an 800 ml pot including 100 balls with a diameter of 15 mm, and rotating the pot at 67 rpm for 100 hours (Comparative Example 2).

The results of Example 1 and Comparative Examples 1 and 2 are shown in Table 1.

Table 1

|  | Yield of polypropylene (g/millimole of Ti) | Activity Yield of polypropylene (g/millimole of Ti.atm.hr) | t-I.T. (boiling n-heptane extraction residue) | Melt index |
|---|---|---|---|---|
| Example 1 | 9600 | 300 | 93.9 | 1.7 |
| Comparative Example 1 | 2100 | 53 | 87.1 | 1.2 |
| Comparative Example 2 | 1500 | 47 | 85.2 | 1.3 |

EXAMPLE 2

A titanium catalyst component containing 2.30% by weight of titanium and 61.95% by weight of chlorine was prepared by the same procedure as in Example 1 except that 7.76 g of n-butanol was used instead of the ethanol, and the reaction of the copulverized product with titanium tetrachloride was performed at 100° C.

The same polymerization as in Example 1 was performed using the resulting catalyst component (A), thereby to afford 341.4 g of polypropylene as a white powder which had a boiling n-heptane extraction residue of 95.1%, an apparent density of 0.33 g/ml and a melt index of 0.8. On the other hand, concentration of the liquid phase afforded 9.6 g of a solvent-soluble polymer.

A fine powdery polymer having a particle size of less than 105 microns was formed in an amount of 8% by weight.

EXAMPLE 3

A catalyst component (A) containing 3.35% by weight of titanium and 53.70% by weight of chlorine was prepared in the same way as in Example 2 except that the amount of the n-butanol was changed to 31.06.

The same polymerization as in Example 1 was performed except that this catalyst component (A) was used, and the polymerization pressure was changed to 10 kg/cm². Thus, 200.8 g of a white powdery polymer was obtained. The polymer had a boiling n-heptane extraction residue of 96.5%, an apparent density of 0.37 g/ml and a melt index of 0.5. Concentration of the liquid phase afforded 4.2 g of a solvent-soluble polymer. A fine powdery polymer having a particle diameter of less than 105 microns was formed in an amount of 13% by weight.

EXAMPLE 4

Preparation of catalyst component (A)

Commercially available anhydrous magnesium chloride (20 g), 5.74 g of ethyl o-toluate and 2.27 g of o-cresol were placed in the same ball mill cylinder as set forth in Example 1 under an atmosphere of nitrogen, and contacted with one another at an impact acceleration of 7G for 24 hours. Ten grams of the resulting solid product was suspended in 100 ml of titanium tetrachloride, and the mixture was stirred at 80° C. for 2 hours. The solid component was collected by filtration, and washed with refined hexane until free titanium tetrachloride was no longer detected in the wash liquid. The product was then dried to afford a titanium-containing solid catalyst component (A) containing 4.2% by weight of titanium and 60.0% by weight of chlorine.

Polymerization

A 2-liter autoclave was purged with propylene, and then charged with 750 ml of hexane thoroughly deprived of oxygen and water, 0.428 g (3.75 millimoles) of triethyl aluminum, 0.205 g (1.25 millimoles) of ethyl p-toluate, and 0.026 g (0.0225 millimole calculated as titanium atom) of the solid catalyst component (A) obtained by the procedure of the previous section. The autoclave was sealed, and 0.5 Nl of hydrogen was introduced. The temperature was raised, and when the temperature of the polymerization system reached 60° C., propylene was introduced and its polymerization was started at a total pressure of 8 kg/cm². After polymerization at 60° C. for 4 hours, the introduction of propylene was stopped, and the inside of the autoclave was cooled to room temperature. The resulting solid was collected by filtration, and dried to afford 380.4 g of polypropylene as a white powder which had a boiling n-heptan extraction residue of 95.3%, an apparent density of 0.31 g/ml, and a melt index of 3.55. On the other hand, concentration of the liquid phase afforded 12.1 g of a solvent-soluble polymer.

A fine powdery polymer having a particle size diameter of less than 105 microns was formed in an amount of 12.6% by weight. The yield of the polymer (g/Cl g) was 25,000.

EXAMPLE 5

Preparation of the catalyst component (A)

Anhydrous magnesium chloride (20 g) was suspended in 200 ml of kerosene containing 7.5 ml of ethyl benzoate, and with stirring, they were reacted at 150° C. for 2 hours. The solid component was collected by filtration, washed thoroughly with hexane, and dried to afford 26.7 g of a white powdery solid which was considered to be a complex having an average composition: MgCl₂ 0.22

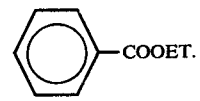

The resulting powdery solid (26 g) and 2.85 g of cumyl alcohol were placed in the same ball mill cylinder as set forth in Example 1, and contacted with one another at an impact acceleration of 7G for 24 hours. The resulting solid product was suspended in 150 ml of titanium tetrachloride, and stirred at 80° C. for 2 hours. The solid component was collected by filtration, and washed with refined hexane until free titanium tetrachloride was no longer detected in the wash liquid. The resulting titanium-containing catalyst component contained 3.2% by weight of titanium and 58.0% by weight of chlorine.

Polymerization

Propylene was polymerized under the same conditions as in Example 4 using 0.034 g of the resulting solid catalyst component (A), 0.428 g of triethyl aluminum and 0.743 g of triisobutyl aluminum. As a result, 263 g of polypropylene as a white powder and 9.8 g of a solvent-soluble polymer were obtained. The powdery polypropylene obtained has a boiling n-heptane extraction residue of 95.6%, an apparent density of 0.30 g/ml and a melt index of 3.86.

A fine powdery polymer having a particle diameter of less than 105 microns was formed in an amount of 12.1% by weight. The yield of the polymer (g/Cl g) was 14,000.

Comparative Example 3

A titanium catalyst component (A) containing 3.8% by weight of titanium and 59.0% by weight of chlorine was prepared in the same way as in Example 4 except that o-cresol was not used.

Propylene was polymerized under the same conditions as in Example 4 using 0.028 g of the resulting titanium catalyst component (A). As a result, 138.5 g of a powdery solid polymer and 5.6 g of a solvent-soluble polymer were obtained. The powdery solid polymer had a boiling n-heptane extraction residue of 94.9%, and apparent density of 0.32 g/ml and a melt index of 5.08.

A fine powdery polymer having a particle diameter of less than 105 microns was formed in an amount of 25.0% by weight. The yield of the polymer (g/Cl g) was 8,600.

EXAMPLES 6 TO 8

A solid titanium catalyst component (A) was prepared in the same way as in Example 4 except that each of the active hydrogen-containing compounds shown in Table 2 was used in the amounts indicated instead of the o-cresol.

Propylene was polymerized in the same way as in Example 4 using the resulting titanium catalyst component (A) in an amount of 0.032 g (Example 6), 0.030 g (Example 7), and 0.028 g (Example 8), respectively.

The results are shown in Table 2.

Table 2

| | Catalyst component | | | | | | | | | |
|---|---|---|---|---|---|---|---|---|---|---|
| | Active hydrogen containing compound | | Composition | | Amount of powdery solid (g) | Amount of solvent-soluble polymer (g) | Extraction residue of the powder (%) | Apparent density (g/ml) | Melt index (g/10 min.) | Polymer yield (g/Cl g) | Amount of a fine powdery polymer (less than 105 μ) (wt. %) |
| Example | Type | Amount (g) | Ti wt. % | Cl wt. % | | | | | | | |
| 6 | α-Naphthol | 3.0 | 3.4 | 57.0 | 252.9 | 8.9 | 95.1 | 0.32 | 12.9 | 14,000 | 12.0 |
| 7 | 2,6-Di-t-butyl-4-methylphenol | 4.6 | 3.6 | 58.0 | 224.6 | 8.0 | 95.4 | 0.28 | 6.07 | 13,000 | 12.1 |
| 8 | 2-Ethylhexanol | 2.7 | 3.9 | 57.0 | 213.8 | 6.2 | 94.8 | 0.32 | 5.92 | 14,000 | 8.5 |

EXAMPLES 9 TO 14

Propylene was polymerized under the same conditions as in Example 4 using the same solid catalyst component (A) as used in Example 4 and each of the organic acid esters indicated in Table 3 in the amounts indicated. The results are also shown in Table 3.

Table 3

| Example | Organic acid ester | | Amount of powdery solid polymer (g) | Amount of solvent-soluble polymer (g) | Extraction residue of the powder | Apparent density (g/ml) | Melt index (g/10 min.) | Polymer (g/Cl g) | Amount of a fine powdery polymer (less than 105 μ) (wt.%) |
|---|---|---|---|---|---|---|---|---|---|
| | Type | Amount (g) | | | | | | | |
| 9 | Ethyl p-anisate | 0.205 | 370.6 | 14.5 | 95.4 | 0.30 | 3.65 | 25,000 | 11.0 |
| 10 | Methyl p-toluate | 0.188 | 360.6 | 13.8 | 95.1 | 0.30 | 4.21 | 24,000 | 11.2 |
| 11 | Ethyl p-t-butylbenzoate | 0.258 | 396.5 | 14.2 | 95.5 | 0.20 | 4.85 | 27,000 | 10.3 |
| 12 | Ethyl p-aminobenzoate | 0.206 | 380.3 | 15.9 | 94.5 | 0.30 | 3.21 | 26,000 | 10.4 |
| 13 | Ethyl p-hydroxybenzoate | 0.208 | 350.6 | 16.1 | 94.5 | 0.30 | 2.86 | 24,000 | 10.9 |
| 14 | Dimethyl terephthalate | 0.245 | 230.5 | 10.8 | 95.9 | 0.30 | 3.55 | 16,000 | 12.5 |

EXAMPLE 15

Preparation of the catalyst component (A)

A catalyst component (A) containing 4.3% by weight of titanium and 57.0% by weight of chlorine was prepared under the same conditions as in Example 4 except that a compound of the following formula

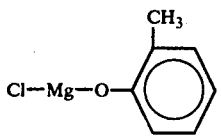

prepared in a conventional manner was used instead of the anhydrous magnesium chloride, and 2 85 g of cumyl alcohol was used instead of 2.27 g of o-cresol.

Polymerization

Propylene was polymerized under the same conditions as in Example 4 except that 0.025 g of the catalyst component (A) obtained by the procedure set forth in the previous section was used. As a result, 208.5 g of polypropylene as a white powder and 10.8 g of a solvent-soluble polymer were obtained. The powdery polymer had an extraction residue of 94.2%, an apparent density of 0.29 g/ml, and an melt index of 4.86.

The yield of the polymer (g/Cl g) was 15,000 and the amount of a very fine powdery polymer having a particle diameter of less than 105 microns was 5.0% by weight.

EXAMPLE 16

Preparation of the catalyst component (A)

Commercially available anhydrous magnesium chloride (20 g), 12.4 g of a complex having an average composition TiCl₄-(ethyl p-toluate), and 2.85 g of cumyl alcohol were copulverized under the conditions set forth in Example 4, and treated with titanium tetrachloride. The resulting solid catalyst component (A) contained 4.5% by weight of titanium and 58.0% by weight of chlorine.

Polymerization

Propylene was polymerized under the same conditions as in Example 4 using 0.024 g of the titanium catalyst component (A) obtained by the procedure set forth in the previous section. As a result, 300.6 g of a white powdery solid polymer and 13.1 g of a solvent-soluble polymer were obtained. The powdery solid had an extraction residue of 94.9%, an apparent density of 0.30 g/ml, and a melt index of 4.21.

The yield of the polymer (g/Cl g) was 23,000 and the amount of a very fine polymer having a particle diameter of less than 105 microns was 10.1% by weight.

EXAMPLE 17

Anhydrous magnesium chloride (10 g), 2.87 g of ethyl o-toluate, and 1.43 g of cumyl alcohol were pulverized in a vibratory mill under the same conditions as in Example 4. Ten grams of the resulting solid product was suspended in titanium tetrachloride, and stirred at 80° C. for 2 hours. The solid component was collected by filtration, and washed with refined hexane until free titanium tetrachloride was no longer detected in the wash liquid. The washed product was dried to afford a titanium-containing catalyst component (A) containing 2.2% by weight of titanium and 31.0% by weight of chlorine.

Propylene was polymerized under the same conditions as in Example 4 using 0.049 g of the solid titanium catalyst component (A) obtained by the procedure set forth above. As a result, 224.6 g of a powdery solid and 12.6 g of a solvent-soluble polymer were obtained. The powdery solid had an extraction residue of 93.9%, an apparent density of 0.26 g/ml, and a melt index of 8.83.

The yield of the polymer (g/Cl g) was 8,800 and the amount of a very fine polymer having a particle diameter of less than 105 microns was 9.5% by weight.

What we claim is:

1. A process for preparing a highly stereo-regular polymer or copolymer, which comprises polymerizing an α-olefin having at least 3 carbon atoms or copolymerizing said α-olefin with a minor amount of ethylene or a diene in the presence of a catalyst comprising (A) a mechanically pulverized solid halogen-containing titanium catalyst component and (B) an organoaluminum compound, and also in the presence of an aromatic carboxylic acid ester having from 8 to 40 carbon atoms, said solid halogen-containing titanium catalyst component being obtained by reacting (I) a mechanically copulverized solid component consisting essentially of and being derived from
   1. a magnesium compound of the formula $MgX^1X^2$ wherein $X^1$ is a halogen atom and $X^2$ is a member selected from the group consisting of halogen atoms and OR″ in which R″ is selected from the group consisting of alkyl groups, cycloalkyl groups and aryl groups,
   2. an organic acid ester selected from the group consisting of esters formed between a member selected from the group consisting of saturated or unsaturated aliphatic carboxylic acids containing 1 to 18 carbon atoms and halogen-substituted products of saturated or unsaturated aliphatic carboxylic acids containing 1 to 18 carbon atoms and a member selected from the group consisting of saturated or unsaturated aliphatic primary alcohols containing 1 to 18 carbon atoms, saturated or unsaturated cycloaliphatic alcohols containing 3 to 8 carbon atoms, phenols containing 6 to 10 carbon atoms, saturated or unsaturated primary alcohols containing 1 to 4 carbon atoms which are bonded to an aliphatic ring with 3 to 10 carbon atoms and saturated or unsaturated primary alcohols containing 1 to 4 carbon atoms which are bonded to an aromatic ring with 6 to 10 carbon atoms; esters formed between alicyclic carboxylic acids containing 6 to 12 carbon atoms and saturated or unsaturated aliphatic primary alcohols containing 1 to 8 carbon atoms; esters formed between aromatic carboxylic acids containing 7 to 18 carbon atoms and saturated or unsaturated aliphatic primary alcohols containing 1 to 18 carbon atoms, saturated or unsaturated cycloaliphatic alcohols containing 3 to 8 carbon atoms, phenols containing 6 to 10 carbon atoms, saturated or unsaturated primary alcohols containing 1 to 4 carbon atoms which are bonded to an aliphatic ring with 3 to 10 carbon atoms or saturated or unsaturated primary alcohols containing 1 to 4 carbon atoms which are bonded to an aromatic ring with 6 to 10 carbon atoms; and lactones containing 4 to 10 carbon atoms, and
   3. an active hydrogen-containing compound selected from the group consisting of aliphatic alcohols containing 1 to 12 carbon atoms, alicyclic alcohols containing 3 to 12 carbon atoms, aromatic alcohols containing 7 to 12 carbon atoms and phenols containing 6 to 18 carbon atoms, wherein the ratio between the magnesium compound (1) and the organic acid ester (2) is such that the latter is used in an amount of about 0.01 to about 10 moles per atom of magnesium, and the amount of the active hydrogen-containing compound (3) is about 0.001 to about 10 moles per atom of magnesium in the magnesium compound (1); in the absence of mechanical pulverization and at a reaction temperature of about 20° to about 200° C. with (II) a tetravalent titanium compound which is liquid under the reaction conditions and has the formula $Ti(OR)_gX_{4-g}$ wherein R is a hydrocarbon radical selected from the group consisting of alkyl groups containing 1 to 4 carbon atoms, cycloalkyl groups containing 6 to 12 carbon atoms and aryl groups containing 6 to 10 carbon atoms, X is a halogen atom, and g is $0 \leqq g \leqq 4$, at a ratio of titanium atom to magnesium atom of at least 0.05:1.

2. The process of claim 1 wherein the amount of the titanium-containing catalyst component (A) used is about 0.001 to about 0.5 millimole calculated as titanium atom per liter of the liquid phase in the reaction zone.

3. The process of claim 1 wherein the amount of the organoalumium compound (B) used is about 0.1 to about 50 millimoles calculated as a metallic atom per liter of the liquid phase in the reaction zone.

4. A catalyst composition for the polymerization or copolymerization of α-olefins which comprises (A) a mechanically pulverized solid halogen-containing titanium catalyst component and (B) an organoaluminum compound wherein said solid halogen-containing titanium catalyst component is obtained by reacting (I) a mechanically copulverized solid component consisting essentially of and being derived from
   1. a magnesium compound of the formula $MgX^1X^2$ wherein $X^1$ is a halogen atom and $X^2$ is a member selected from the group consisting of halogen atoms and OR″ in which R″ is selected from the group consisting of alkyl groups, cycloalkyl groups and aryl groups,
   2. an organic acid ester selected from the group consisting of esters formed between a member selected from the group consisting of saturated or unsaturated aliphatic carboxylic acids containing 1 to 18 carbon atoms and halogen-substituted products of saturated or unsaturated aliphatic carboxylic acids containing 1 to 18 carbon atoms and a member selected from the group consisting of saturated or unsaturated aliphatic primary alcohols containing 1 to 18 carbon atoms, saturated or unsaturated cycloaliphatic alcohols containing 3 to 8 carbon atoms, phenols containing 6 to 10 carbon atoms, saturated or unsaturated primary alcohols containing 1 to 4 carbon atoms which are bonded to an aliphatic ring with 3 to 10 carbon atoms and saturated or unsaturated primary alcohols containing 1 to 4 carbon atoms which are bonded to an aromatic ring with 6 to 10 carbon atoms;

esters formed between alicyclic carboxylic acids containing 6 to 12 carbon atoms and saturated or unsaturated aliphatic primary alcohols containing 1 to 8 carbon atoms; esters formed between aromatic carboxylic acids containing 7 to 18 carbon atoms and saturated or unsaturated aliphatic primary alcohols containing 1 to 18 carbon atoms, saturated or unsaturated cycloaliphatic alcohols containing 3 to 8 carbon atoms, phenols containing 6 to 10 carbon atoms, saturated or unsaturated primary alcohols containing 1 to 4 carbon atoms which are bonded to an aliphatic ring with 3 to 10 carbon atoms or saturated or unsaturated primary alcohols containing 1 to 4 carbon atoms which are bonded to an aromatic ring with 6 to 10 carbon atoms; and lactones containing 4 to 10 carbon atoms, and 3. an active hydrogen-containing compound selected from the group consisting of aliphatic alcohols containing 1 to 12 carbon atoms, alicyclic alcohols containing 3 to 12 carbon atoms, aromatic alcohols containing 7 to 12 carbon atoms and phenols containing 6 to 18 carbon atoms, wherein the ratio between the magnesium compound (1) and the organic acid ester (2) is such that the latter is used in an amount of about 0.01 to about 10 moles per atom of magnesium, and the amount of the active hydrogen-containing compound (3) is about 0.001 to about 10 moles per atom of magnesium in the magnesium compound (1);

in the absence of mechanical pulverization and at a reaction temperature of about 20° to about 200° C. with (II) a tetravalent titanium compound which is liquid under the reaction conditions and has the formula $$Ti(OR)_g X_{4-g}$$

wherein R is a hydrocarbon radical selected from the group consisting of alkyl groups containing 1 to 4 carbon atoms, cycloalkyl groups containing 6 to 12 carbon atoms and aryl groups containing 6 to 10 carbon atoms, X is a halogen atom, and g is $0 \leq g \leq 4$, at a ratio of titanium atom to magnesium atom of at least 0.05:1.

* * * * *